(12) United States Patent
Kastner (10) Patent No.: US 6,495,974 B1
(45) Date of Patent: Dec. 17, 2002

(54) POWER SUPPLY FOR BRIGHTNESS CONTROL OF A GAS-DISCHARGE TUBE

(75) Inventor: Mark Kastner, New Berlin, WI (US)

(73) Assignee: Everbrite, Inc., Greenfield, WI (US)

( * ) Notice: Subject to any disclaimer, the term of this patent is extended or adjusted under 35 U.S.C. 154(b) by 0 days.

(21) Appl. No.: 09/961,620

(22) Filed: Sep. 24, 2001

(51) Int. Cl.[7] .............................................. G05F 1/00
(52) U.S. Cl. .................. 315/307; 315/291; 315/209 R; 315/244; 315/360; 315/DIG. 4; 315/DIG. 7
(58) Field of Search ........................... 315/209 R, 244, 315/276, 291, 297, 307, 360, 362, DIG. 2, DIG. 4, DIG. 7

(56) References Cited

U.S. PATENT DOCUMENTS

| | | | |
|---|---|---|---|
| 4,358,716 A | | 11/1982 | Cordes et al. |
| 5,410,216 A | * | 4/1995 | Kimoto et al. ............... 313/485 |
| 5,500,792 A | * | 3/1996 | Jeon et al. .................. 315/190 |
| 5,834,906 A | * | 11/1998 | Chou et al. ................. 315/247 |
| 6,094,017 A | * | 7/2000 | Adamson ................. 315/209 R |
| 6,348,769 B1 | * | 2/2002 | Pinchuk et al. ............. 315/244 |
| 6,404,140 B1 | * | 6/2002 | Nerone ................... 315/209 R |

* cited by examiner

Primary Examiner—Haissa Philogene
(74) Attorney, Agent, or Firm—Michael Best & Friedrich LLP (57) ABSTRACT

A power supply connectable to a power source and to a gas-discharge tube. The power supply includes a transformer having a primary winding, a secondary winding, and first and second switches. The switches receive first and second drive signals, respectively, and switch power to the primary winding. The power supply further includes a controller interconnected to the first and second power switches. The controller is operable to generate the first and second drive signals for a time period. For a first time interval of the time period, the controller transitions the first and second drive signals from a first frequency to a second frequency. For a second time interval of the time period, the controller generates the first and second drive signals at the second frequency. For a third interval of the time period, ceases generation of the varying signal.

45 Claims, 9 Drawing Sheets

POWER SUPPLY FOR BRIGHTNESS CONTROL OF A GAS-DISCHARGE TUBE

BACKGROUND OF THE INVENTION

The invention relates to a power supply for brightness control of a gas-discharge tube, and particularly to a power supply that provides a combination of frequency transitioning and pulse-group modulation for controlling the brightness of a gas-discharge tube.

It is desirable to control the brightness of a neon sign or other gas-discharge tube application. Controlling the brightness of a gas-discharge tube requires some sort of variable power source to drive the tube. The power source is typically one of two types: a "transformer" type power source, or a "power supply" type power source. The "transformer" type power source steps up the utility voltage, and drives the gas-discharge tube at utility frequency (e.g., 50 or 60 Hz). The "power supply" type power source rectifies the line voltage to form DC rail voltages, inverts the rail voltages at relatively high frequencies (typically 20–100 kHz), and drives a small step-up transformer that drives the tube. The present invention deals with a gas-discharge tube having a "power supply" type power source.

Numerous methods have been used in an attempt to dim a gas-discharge tube powered from a power supply. Some methods attempt to reduce the energy delivered to the tube on a continuous basis by reducing the DC rail voltages applied to the inverter. This and similar methods suffer from a common disadvantage; when dimmed, the center of large signs including the gas-discharge tube becomes dimmer than the sections electrically close to the incoming power.

Figure 1:
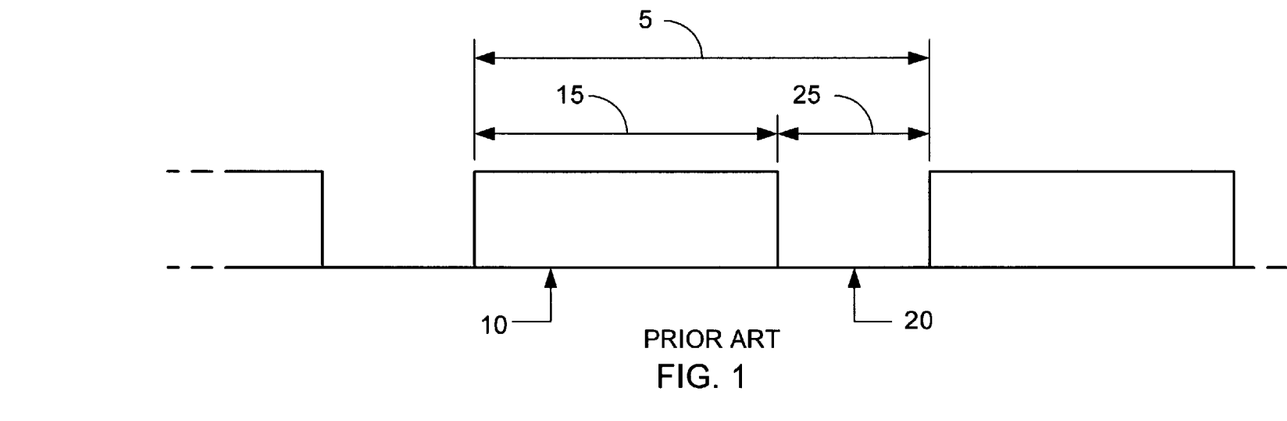
FIG. 1 is a timing diagram representing the prior art pulse group modulation control of a power supply connected to a gas-discharge tube.

One dimming method that gives the greatest range of dimming, with no significant difference in intensity along the length of the tube, is pulse group modulation ("PGM"). For PGM and as shown in FIG. 1, the inverter is operated at full input voltage and optimum frequency (e.g., 20 kHz) for a first interval 15 of a time period 5 (i.e., a first group of pulses 10 is generated for a first interval 15). The inverter is then "OFF" for a second interval 25 of the time period 5 (i.e., no group of pulses 20 is generated in the second interval 25). The result is groups of drive pulses being delivered to the transformer and to the tube load. The ON and OFF pulsing is continuously performed at a sufficiently high repetition rate to prevent the perception of flickering (about 100–200 Hz). The overall repetition rate is kept constant, while the lengths of the first and second intervals 15 and 25 are varied to implement dimming. The tube is at full intensity when the ON interval 15 occupies the entire time period 5, and the tube is off when the OFF interval 25 occupies the entire time period 5. In between lies a smooth range of dimming from off to fully bright.

Pulse group modulation suffers from one major drawback. The step-up transformer oscillates at the pulse group repetition rate, producing a loud buzz. A subtler drawback of PGM dimming is that, at lower brightness levels, the tube may extinguish and re-ignite with each pulse group 15. This continuous re-ionization generates radiation electromagnetic interference (EMI).

Figure 2:
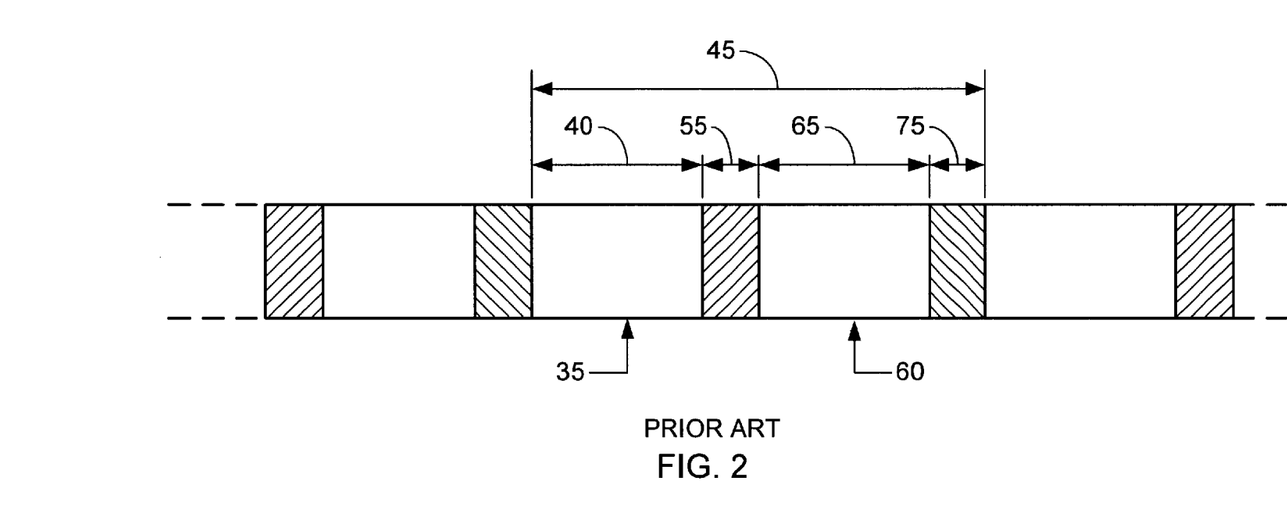
FIG. 2 is a timing diagram representing the prior art frequency-shift-key dimming control of a power supply connected to a gas-discharge tube.

One prior art method used to combat the above problems is frequency-shift-key (FSK) dimming (see FIG. 2). FSK dimming entails producing a first group of pulses 35 for a first interval 40 of a time period 45 (referred to as the "ON" portion or mode), ramping to a higher pulse frequency during a second interval 55, producing a second group of pulses 60 for a third interval 65 (referred to as the "OFF" portion or mode), and ramping down to the frequency of the first group of pulses 35 in a fourth interval 75. The transformer and tube are continuously driven, but with a much lower energy transfer efficiency during the "OFF" portion 60. By varying the amount of time spent in the normal high efficiency "ON" mode 45 and the low efficiency "OFF" mode 55, the sign can be progressively dimmed. Also, since the transformer is continuously driven, the audible noise generated by the pulse group repetition is dramatically reduced.

FSK dimming suffers from one major drawback. The continuously changing drive frequencies generate a wide spectrum of noise, making EMI filtering difficult. However, since FSK dimming continuously drives the tube, it is always ignited, and reignition EMI is not a concern.

SUMMARY OF THE INVENTION

The invention provides a power supply connectable to a power source and to a gas-discharge tube. The supply includes a transformer having a primary winding and a secondary winding. The tube is connectable across the secondary winding. The power supply further includes first and second switches that receive first and second drive signals, respectively, and switch power to the primary winding. The power supply further includes a resonant circuit interconnected to the first and second switches, and a controller interconnected to the first and second power switches. The controller is operable to generate the first and second drive signals for a time period. For a first time interval of the time period, the controller generates the first and second drive signals at a first frequency, and transitions the first and second drive signals from the first frequency to a second frequency. For a second time interval of the time period, the controller generates the first and second drive signals at the second frequency. For a third interval of the time period, the controller ceases generation of the first and second drive signals.

The invention also provides a method of controlling the brightness of a gas-discharge tube. The method includes providing a power supply having a resonant circuit, establishing a time period, and generating a varying signal having a varying frequency. The generating of a varying signal includes: for a first time interval of the time period, transitioning the varying frequency from a first frequency to a second frequency; for a second interval of the time period after the first interval, generating the varying signal at the second frequency; and, for a third interval of the time period, ceasing generation of the varying signal. The method further includes providing the varying signal to the resonant circuit.

As was stated earlier, for PGM, the gas-discharge tube may de-ionize between ON intervals when the power source ceases generation of drive signals for extended OFF intervals. De-ionizing the tube results in the tube re-ionizing at the beginning of each pulse group. Since the strike voltage of the tube is typically much higher than the run voltage of the tube, continuous tube re-ionization produces a steady stream of high voltage re-strikes in the tube. High voltage breakdown is more likely for the tube because of the frequent presence of high voltage on the output of the power supply. Consequently, greater high voltage insulation is required, which increases the cost of the power source.

The present invention attempts to overcome the high voltage restrike. The resonant circuit of the power supply operates best at approximately a resonant frequency (e.g., 20 kHz). When a varying signal greater than the resonant frequency is provided to the resonant circuit, the ability of the resonant circuit to transfer energy is compromised. As a result, the voltage at the secondary winding of the power supply's transformer is limited. In one embodiment of the invention, the power supply of the invention starts each pulse group at a higher than normal drive frequency, and slowly transitions the frequency down toward the normal operating frequency. As the frequency drops, the voltage at the secondary of the transformer increases. When a sufficient voltage is reached, the gas ionizes in the tube. Since the tube voltage is increased slowly, the tube is coaxed into conduction at the lowest possible voltage, minimizing the voltage present at the output leads. The voltage applied to the load is limited at the beginning of each pulse group and, thus, is limited at each re-ionization of the tube. This reduces or eliminates the need to change the physical construction of the transformer to accommodate higher voltages. Other features and advantages of the invention will become apparent to those skilled in the art upon review of the following detailed description, claims, and drawings.

Before any embodiments of the invention are explained, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

DETAILED DESCRIPTION

Figure 3:
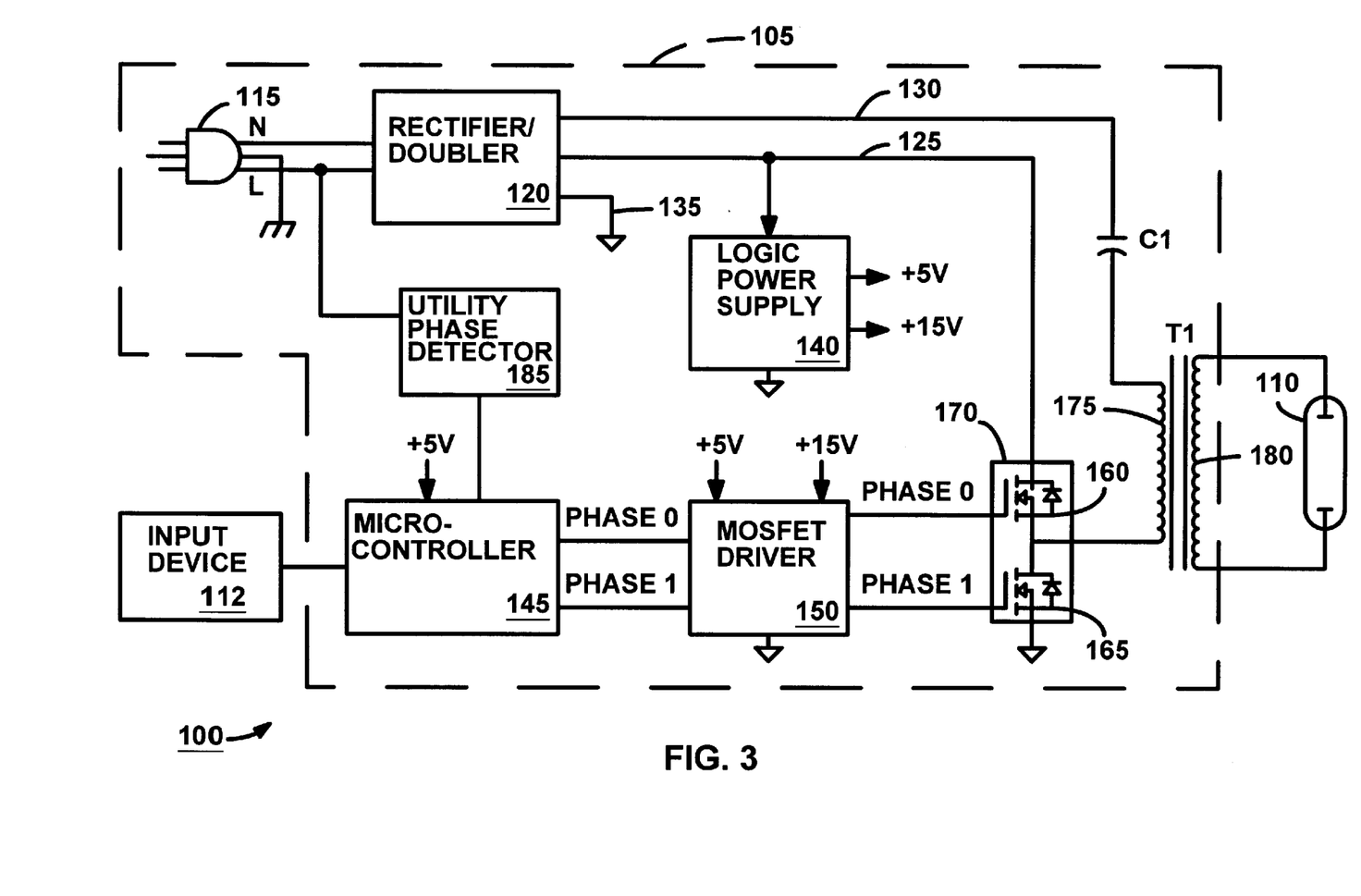
FIG. 3 is a schematic representation of one embodiment of a power supply of the invention.

For the figures, common elements are designated with the same reference numerals. A lamp 100 including a power supply 105 of the invention is schematically shown in FIG. 3. Although the description herein is for a neon sign, other lamps or signs may be used with the invention. The lamp 100 also generally includes a load 110 and an input device 112.

As shown in FIG. 3, the power supply 105 includes a plug 115 that connects to a power source. The power source may be a 120-volt, alternating current (VAC) power source or a 240-VAC power source. The power from the power source is provided to a rectifier/doubler circuit 120, which is well known in the art. The power from the power source is rectified and doubled (if a 120-VAC source) to form a high-voltage rail 125 (e.g., 340-VDC), an intermediate-voltage rail 130 (e.g., 170-VDC), and a low-voltage rail 135 (e.g., 0-VDC). Although a rectifier/doubler circuit 120 is shown, for 240-VAC applications, only a bridge rectifier is required. Further, the voltages of the high-voltage, intermediate-voltage, and low-voltage rails 125, 130 and 135 may vary.

A logic power supply 140 is electrically interconnected to the high-voltage rail 125, and creates one or more bias-voltages (e.g., a 5-VDC low-bias voltage, and/or a 15-VDC high-bias voltage) for powering logic components. The logic components include a microcontroller 145, and a MOSFET driver 150 for driving first and second MOSFETs 160 and 165. The microcontroller 145 (also referred to herein as the "controller") includes a processing unit and a memory. The memory includes one or more software modules (also referred to herein as software blocks) having instructions. The processing unit obtains, interprets, and executes the instructions to control the MOSFET driver 150 for driving the load 110 according to the description below.

The microcontroller 145 generates control signals for driving or controlling MOSFETs 160 and 165. The control signals include a first control signal phase0 and a second control signal phase1. For the embodiment described, the first and second control signals phase0 and phase1 are transformed by the MOSFET driver 150 to an increased voltage for controlling the MOSFETs 160 and 165. That is, the control signals phase0 and phase1 are provided from the microcontroller 145 to the MOSFET driver 150, which generates drive signals phase0 and phase1. Drive signals phase0 and phase1 are functionally related to the control signals phase0 and phase1 by an increased voltage. For the description below, the terms "control signal" or "drive signal" may be used for the signals generated by the microcontroller 145 or the signals generated by the MOSFET driver 150. Additionally, in some embodiments, the MOSFET driver 150 may not be required.

The first and second MOSFETs 160 and 165 are connected in a half H-bridge configuration (also referred to as a power MOSFET half-bridge drive 170). The first MOSFET 160 is connected to the high-voltage rail 125, the bridge center is connected to a primary side 175 of a transformer T1, and the second MOSFET 165 is connected to the low-voltage rail 135 (also referred to as circuit common). Other switches may be used in replace of the MOSFETs 160 and 165.

The other end of primary winding 175 of transformer T1 is connected to a resonant capacitor C1, which is connected to the intermediate rail 130. The capacitor C1 and the primary winding 175 create a LC-resonant circuit having a resonant frequency. It is envisioned that other resonant circuits may be used with the invention, including placing the capacitor C1 in series with a secondary winding 180 or having a designated resonant circuit separate from the windings of the transformer T1.

The power MOSFET half-bridge drive 170 receives the drive signals phase0 and phase1, and drives the resonant circuit and the transformer T1 with a varying signal having a varying frequency. The varying signal may be an AC signal or an AC signal with a DC offset, and may be a balanced or an unbalanced signal. The signal at the primary winding 175 is reflected at the secondary winding 180 with a voltage and current functionally related to the applied varying signal. In order to deliver a maximum power to the load, the varying signal should be at the resonant frequency of the resonant circuit. Operation on either side of the resonant frequency decreases the power delivered to the load.

Figure 4:
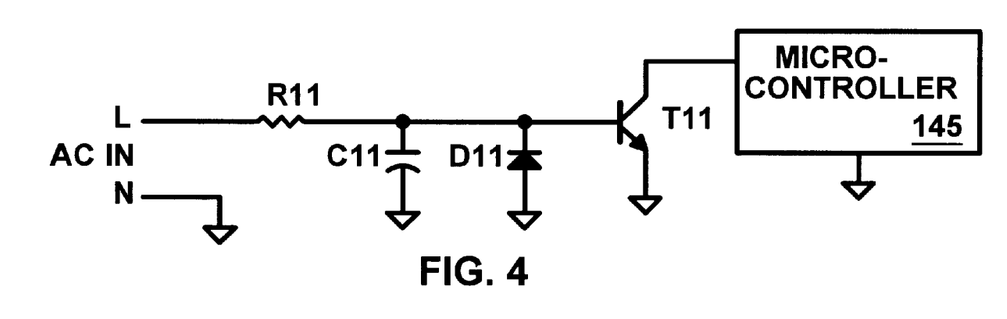
FIG. 4 is an electrical timing diagram representing a utility phase detector capable of being used with the power supply shown in FIG. 3.
Figure 5A:
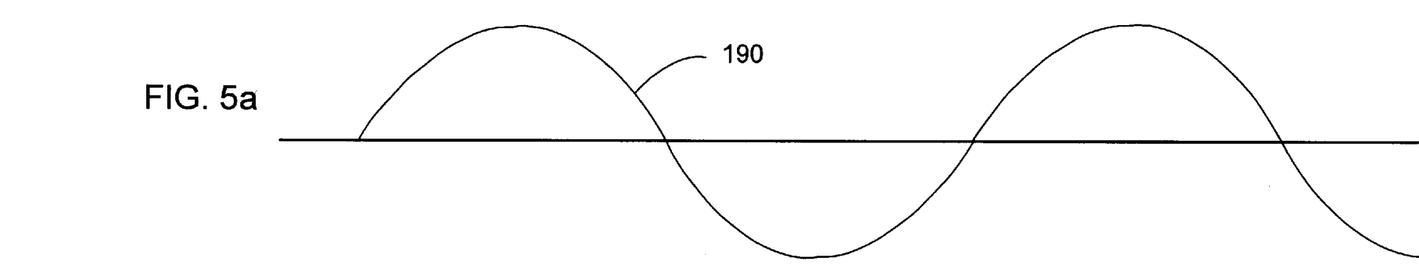
FIG. 5A is a timing diagram representing a utility power signal.
Figure 5B:
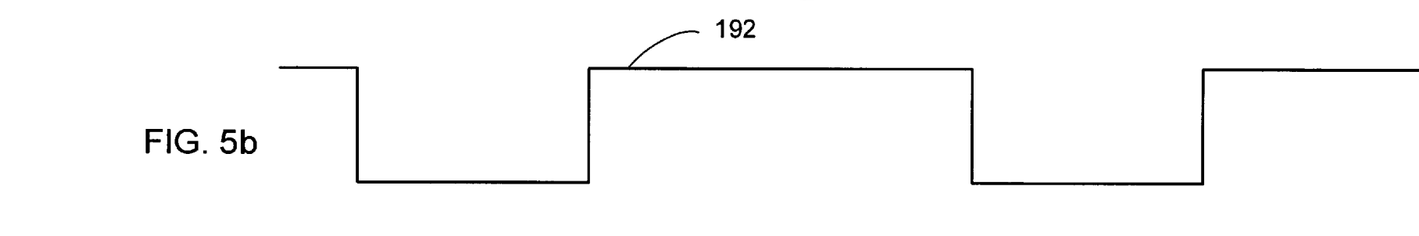
FIG. 5B is a timing diagram representing a signal produced by the utility phase detector shown in FIGS. 3 and 4.
Figure 5C:
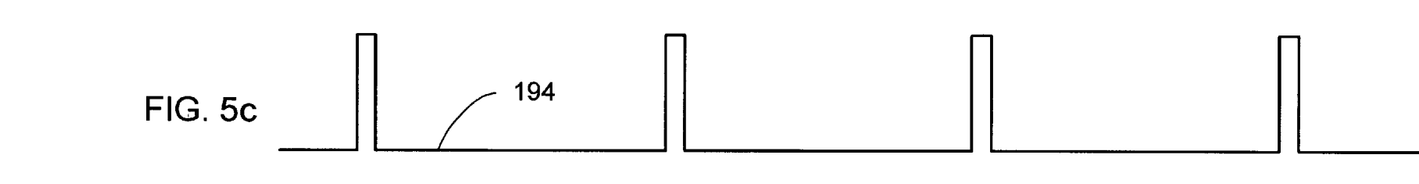
FIG. 5C is a timing diagram representing a "sync" signal produced internally by the microcontroller shown in FIGS. 4 and 6.

The power supply further includes a utility phase detector 185. For the embodiment shown in FIG. 3, the phase detector 185 is connected to the utility line L between the plug 115 and the rectifier/doubler 120. One embodiment of the phase detector 185 is schematically shown in FIG. 4. As shown in FIG. 4, the utility phase detector 185 includes resistor R11, capacitor C11, diode D11 and transistor T11. The phase detector 185 generates a square-wave that acts as a synchronizing signal referenced to the utility or line voltage. For example and as shown in FIG. 5, the utility voltage 190 (FIG. 5A) is applied to the utility phase detector 185. When the utility voltage 190 changes from a negative voltage to a positive voltage (referred to herein as a "positive-going zero crossing"), the phase detector 185 generates a falling edge for the square wave 192 (FIG. 5B). The square wave 192 roughly approximates the utility voltage 190 until the utility voltage performs the next positive-going zero crossing. The resulting square wave 192 is provided to the microcontroller 145. The microcontroller 145 uses the falling edge of the square wave 192 to create internal pulses or logic values 194 (FIG. 5C) synchronized to the zero crossings of the utility voltage 190. Only one edge of the square wave is required to synchronize the internal pulses 194 with the utility voltage 190 because the utility frequency is known (i.e., it is either 50 or 60 Hz.). Based on the synchronized falling square wave edge and the known utility frequency, the microcontroller 145 creates internal pulses or logic values 194 corresponding to the zero crossings of the utility voltage 190.

During operation of the power supply 105 and without the utility phase detector 185, a beat frequency is often formed between the dimming frequency (e.g., 100-Hz. or 120-Hz) and the line frequency (or a harmonic of the line frequency). The beat frequency creates flickering or flashing within the gas-discharge load 110. In order to prevent this problem, the power supply of the invention synchronizes the beginning of each time period (discussed below) with a zero crossing of the utility frequency. Synchronizing the time period prevents the flickering within the load 110.

Figure 6:
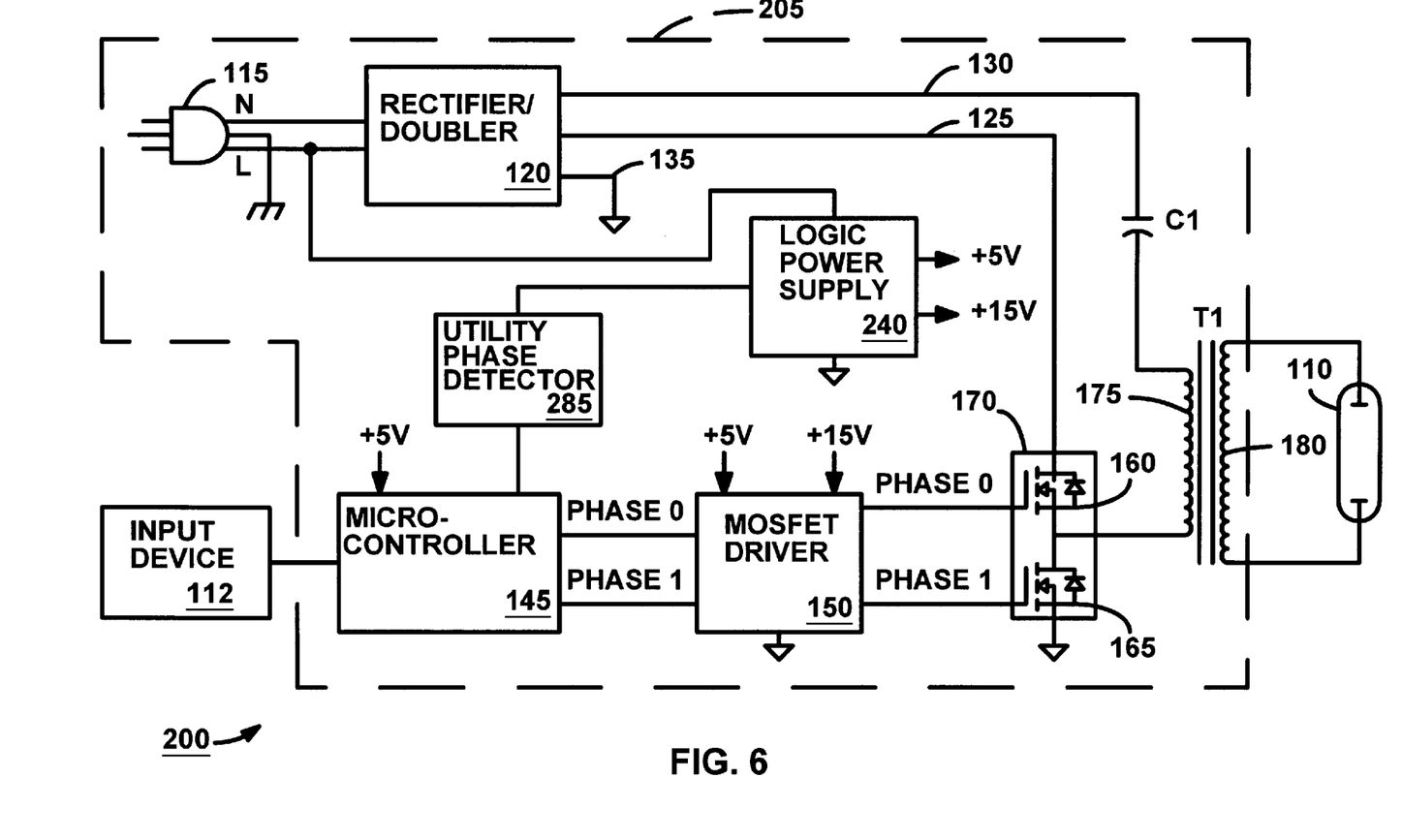
FIG. 6 is a schematic representation of a second embodiment of a power supply of the invention.
Figure 7:
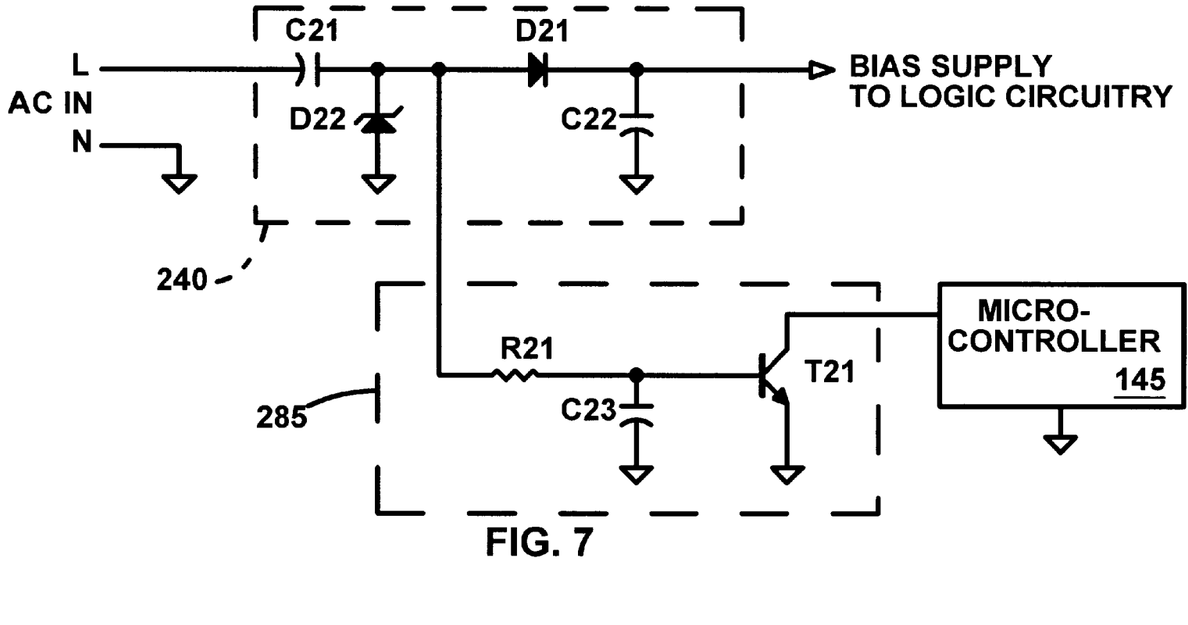
FIG. 7 is an electrical schematic representing a logic power supply and a utility phase detector capable of being used with the power supply shown in FIG. 6.

A second embodiment of the lamp 100 is schematically represented in FIG. 6. For the power supply 205, the logic power supply 240 is electrically connected to the utility line L, and a utility phase detector 285 is connected to the logic power supply 240. Similar to FIG. 3, the logic power supply 240 provides bias voltages to the logic circuitry, and the utility phase detector 285 generates a square wave having at least one edge synced to a zero crossing. One embodiment of the utility phase detector 285 and the logic power supply 240 is shown in FIG. 7. As shown in FIG. 7, the logic power supply 240 includes capacitors C21 and C22, diode D21 and zener diode D22, and the utility phase detector 285 includes resistor R21, capacitor C23, and transistor T21. It is envisioned that other phase detectors may be used with the invention.

The load 110 includes at least one gas-tube interconnected with the secondary winding 180 of the transformer T1. For the embodiments shown, the load 110 is a single neon tube driven by the power supply 105 or 205 at a voltage and a frequency. The voltage and frequency applied to the load 110 varies in part on the frequency applied to the LC circuit by the power MOSFET half-bridge circuit 170.

The input device 112 provides an interface allowing an operator to control the lamp 100, including entering a desired gas-discharge tube brightness level. The input device may further allow the operator to enter other commands such as flashing, fading, and similar features. Example input devices 112 include trim knobs, push buttons (including keyboards and keypads), switches, and other similar input devices. Although the power supply 105 or 205, load 110 and input device 112 is shown and described, the invention may be implemented with other devices including a variety of integrated circuits (e.g., an application-specific-integrated circuit) and discrete devices, as would be apparent to one of ordinary skill in the art.

In operation, an operator activates the lamp 100 by inserting the plug 115 into the power source and turning a master switch ON. Upon activation, the rectifier/doubler 120 rectifies (and doubles) the utility voltage 190 and creates the high, intermediate and low voltage rails 125, 130 and 135, the logic power supply 140 or 240 generates the low and high bias voltages, and the utility phase detector 185 or 285 generates the other square waves 192. The high voltage rail 125 is provided to the MOSFET 160, the intermediate voltage rail 130 is provided to the primary winding 175 via capacitor C1, the low and high bias voltages are provided to the logic components, and the square wave 192 is provided to the microcontroller 145.

The microcontroller 145 receives the low bias voltage, receives the square wave 192, and initializes the processing unit and memory. Upon initializing the processing unit, the one or more software modules are recalled from memory. The one or more software modules include instructions that are interpreted and executed by the processing unit. The executing of the software instructions result in the microcontroller 145 creating the internal pulses or logic values 194, and generating the control signals phase0 and phase1 (discussed further below).

The control signals phase0 and phase1 are provided to the MOSFET driver 150, and the driver 150 controls the first and second MOSFETs 160 and 165 in response thereto. The switching of the MOSFETs 160 and 165 results in a first varying signal being generated in the resonant circuit. The resonant circuit, which includes capacitor C1 and primary winding 175, functionally responds to the frequency of the first varying signal. The frequency of the first varying signal is referred to herein as the varying frequency. The power created by the first varying signal is transferred to the secondary winding 180, which results in a second varying signal that is provided to the load 110. The root-mean-square (RMS) voltage and/or current of the second varying signal is functionally dependent in part on the difference between the varying frequency and the resonant frequency, the parameters of the transformer T1 (e.g., the core, the number of windings in the primary winding, the number of windings in the secondary winding, etc.), and the RMS voltage of the varying signal. If the resonant frequency and the parameters of the transformer are set, then the RMS voltage and/or current of the second varying signal are functionally related to the frequency and RMS voltage of the first varying signal. Further, the frequency and RMS voltage of the first varying signal is functionally related to the signals phase0 and phase1 generated by the microcontroller 145. For the embodiment shown, the one or more software modules stored in memory determine the signals phase0 and phase1.

Figure 5D:
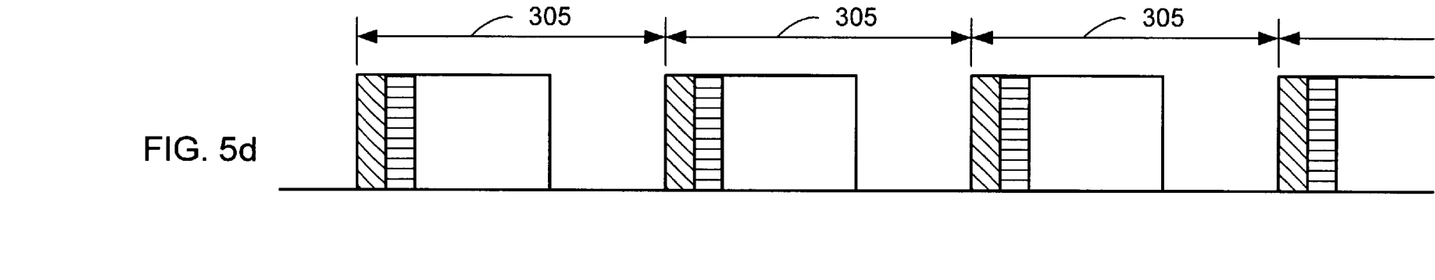
FIG. 5D is a timing diagram representing a varying signal used for brightness control.

The software modules of the invention use frequency transitioning and pulse-group modulation for controlling the intensity of the tube 110. For the embodiment shown in FIG. 5, a modified signal 196 includes a time period 305 that is synced or fixed to the zero crossings of the utility signal 190. Therefore, for the embodiments described herein, the time period 305 is equal to 10.0 ms (for a 50 Hz. utility voltage) or 8.33 ms (for a 60 Hz. utility voltage). However, other time periods are possible and, for some embodiments, the modified signal 196 does not need to be synced to the zero crossings of the utility signal 190.

Figure 8A:
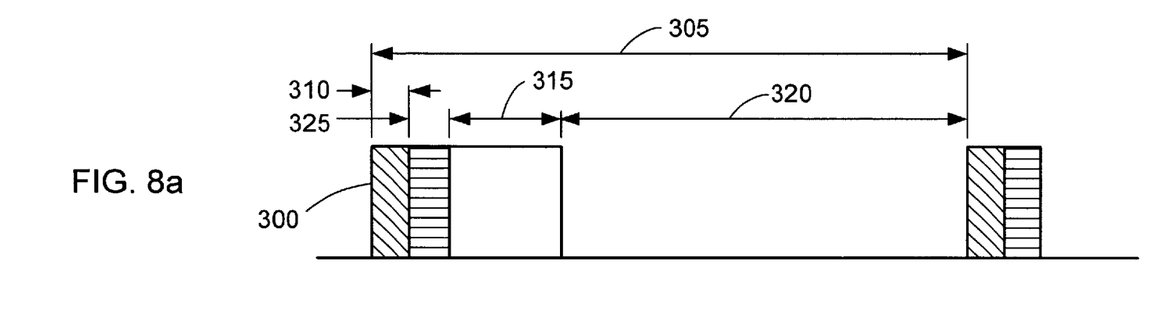
FIGS. 8A to 8C are timing diagrams representing a varying signal at different levels of brightness.
Figure 8B:
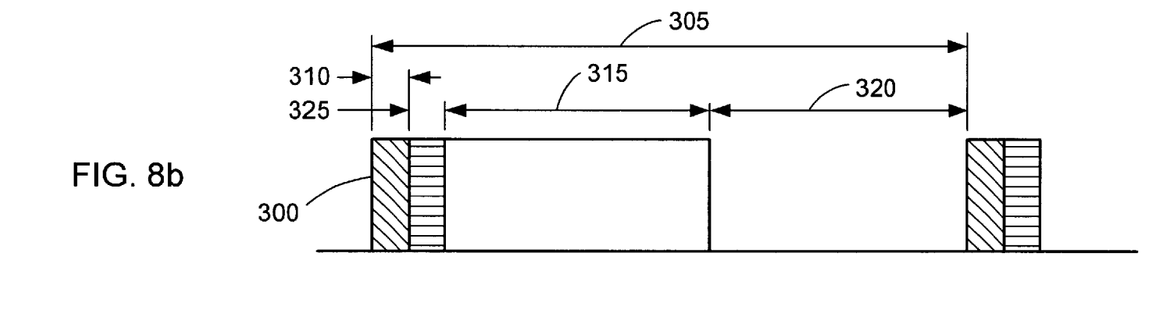
Figure 8C:
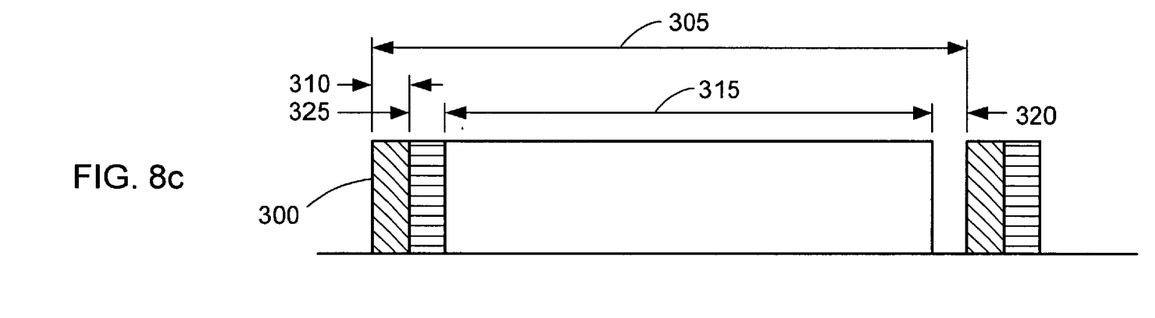

As best shown in FIGS. 8A, 8B and 8C, for a first interval 310 of the time period 305, the drive 170 generates the varying signal with a first frequency, and transitions the varying frequency from the first frequency to a second frequency. In one embodiment, the first frequency is a high frequency and the second frequency is approximately the resonant frequency. As used herein, the term "high" frequency means a frequency (e.g., 100-kHz) greater than the resonant frequency (e.g., 20-kHz). In another embodiment, the first frequency is a low frequency and the second frequency is approximately the resonant frequency. As used herein, the term "low" frequency means a frequency less than the resonant frequency. The first interval 310 is also referred to herein as a frequency-transitioning interval.

As the microcontroller 145 transitions the frequency toward the resonant frequency, the voltage at the secondary of the transformer increases. When a sufficient voltage is reached, the gas ionizes in the tube 110. Since the tube voltage is increased slowly, the tube is coaxed into conduction at the lowest possible voltage, which minimizes the voltage present at the output leads.

After the first interval 310 and for a second interval 315 of the time period 305, the drive 170 generates the varying signal at the second frequency. The second interval 315 is also referred to herein as an "ON" interval. After the second interval 315 and for a third interval 320 of the time period 305, the drive 170 does not generate a varying signal. The third interval 320 is also referred to herein as an "OFF" interval. The length of the second and third intervals 315 and 320 may vary, which determines the brightness of the tube 110. The controlling of the intervals 315 and 320 results in groups of drive pulses being delivered to the transformer and to the tube 110. The ON and OFF pulsing is continuously performed at a sufficiently high repetition rate to prevent the perception of flickering. For the embodiment shown, the repetition rate is 100 Hz. for a 50 Hz. utility voltage, and is 120 Hz. for a 60 Hz. utility voltage. The overall repetition rate is kept constant, while the lengths of the second and third intervals 315 and 320 are varied to implement brightness control for the tube 110. The tube 110 is at maximum brightness when the ON interval 315 substantially occupies the time period 305, and at minimum brightness when the OFF interval 320 substantially occupies the time period 305. In between lies a smooth range of dimming from maximum brightness to minimum brightness.

For example, for the representation shown in FIG. 8A, the tube 110 is at minimum brightness; for the representation shown in FIG. 8B, the tube 110 is at a medium brightness; and for the representation FIG. 8C, the tube 110 is at a maximum brightness. In some embodiments, for minimum brightness, the microcontroller 145 may not generate any varying signal, and, for maximum brightness, the microcontroller 145 may generate the "ON" interval 315 for the complete time period 305.

Figure 9:
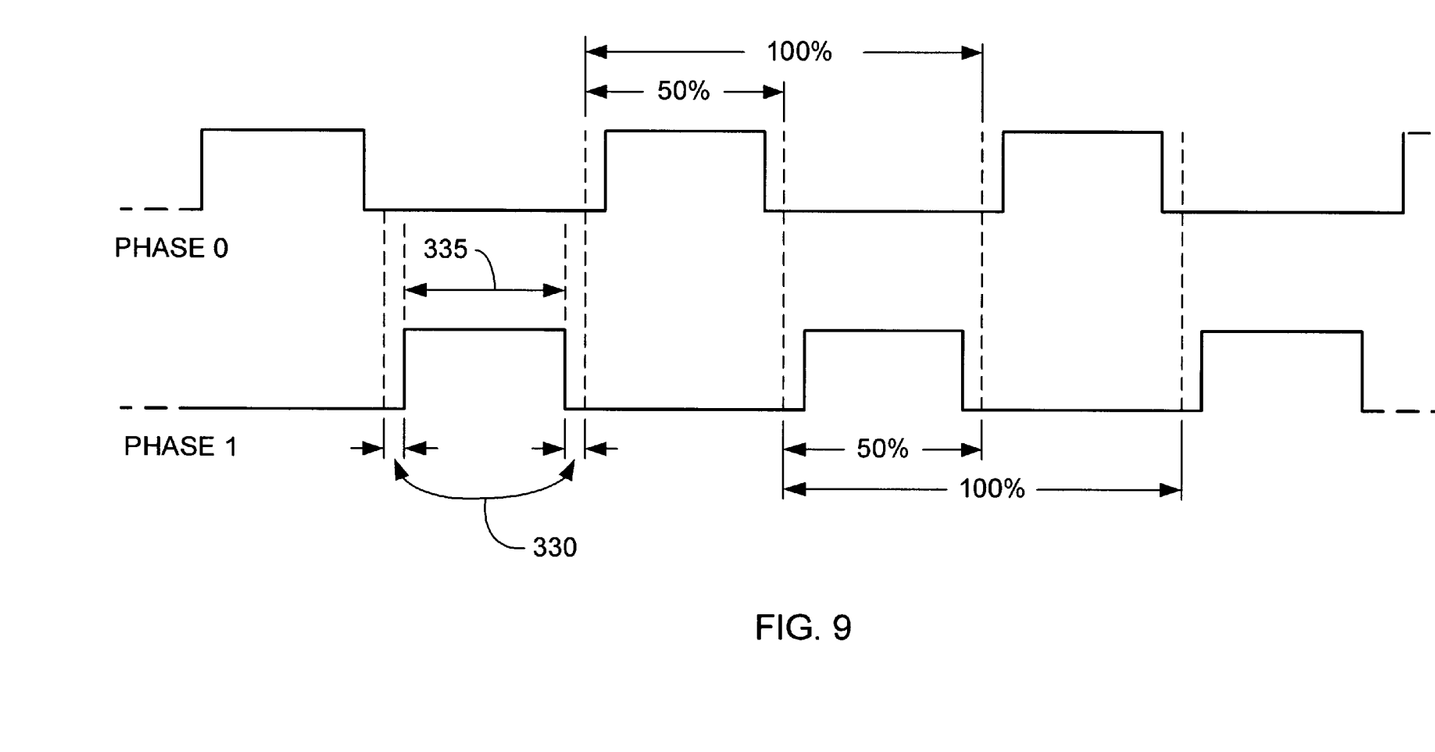
FIG. 9 is a timing diagram representing first and second control signals having a balanced duty cycle.

The optimum waveform to excite mercury-argon tubes is a balanced varying signal or balanced drive. A balanced drive prevents mercury migration in the mercury tube. For a balanced drive, the duty cycle of phase0 and phase1 are the same. FIG. 9 shows the control signals phase0 and phase1 during the "ON" interval 315 for a balanced drive. As schematically shown in FIG. 9, the control signal phase0, which controls MOSFET 160, has a duty cycle of approximately fifty percent, and the control signal phase1, which controls MOSFET 165, has a duty cycle of approximately fifty percent. These two signals result in the drive 170 generating a varying signal having a duty cycle of approximately one hundred percent. As used herein, when referencing a duty cycle percentage, for simplicity, the duty cycle percentage will include subsequent dead times 330 between the drive times 335. Thus, although a particular duty cycle may be stated, the actual duty cycle may slightly vary from the stated duty cycle. The dead times 330 allows each MOSFET 160 and 165 to properly prevent current flow before the other MOSFET 160 or 165 allows current flow. Using optimal dead bands 330 reduces MOSFET heating by eliminating cross-conduction energy that must be absorbed by the MOSFETs 160 and 165.

Figure 10:
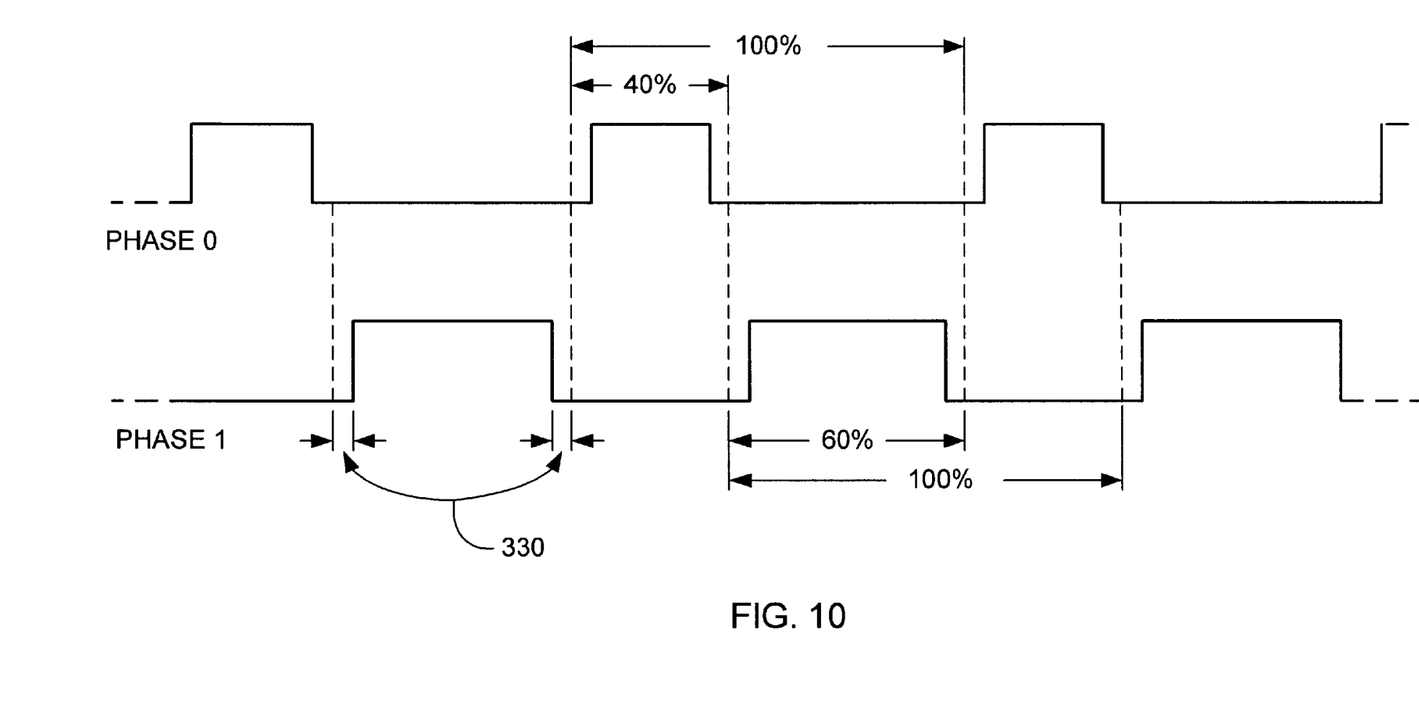
FIG. 10 is a timing diagram representing first and second control signals having an unbalanced duty cycle.

Unlike mercury-argon tubes, a balanced drive for a neon tube causes the neon tubes to form plasma bubbles. One method for preventing plasma bubbles is to generate an offset varying drive signal with the drive 170. As schematically shown in FIG. 10, the signal phase0, which controls MOSFET 160, has a duty cycle of approximately forty percent, and the signal phase 1, which controls MOSFET 165, has a duty cycle of approximately sixty percent. The signals phase0 and phase1 shown in FIG. 6 result in the rive 170 generating a varying signal having a duty cycle of approximately one hundred percent. In addition to preventing plasma bubbles, the polarity of the offset drive may be periodically reversed to prevent mercury migration.

Figure 11:
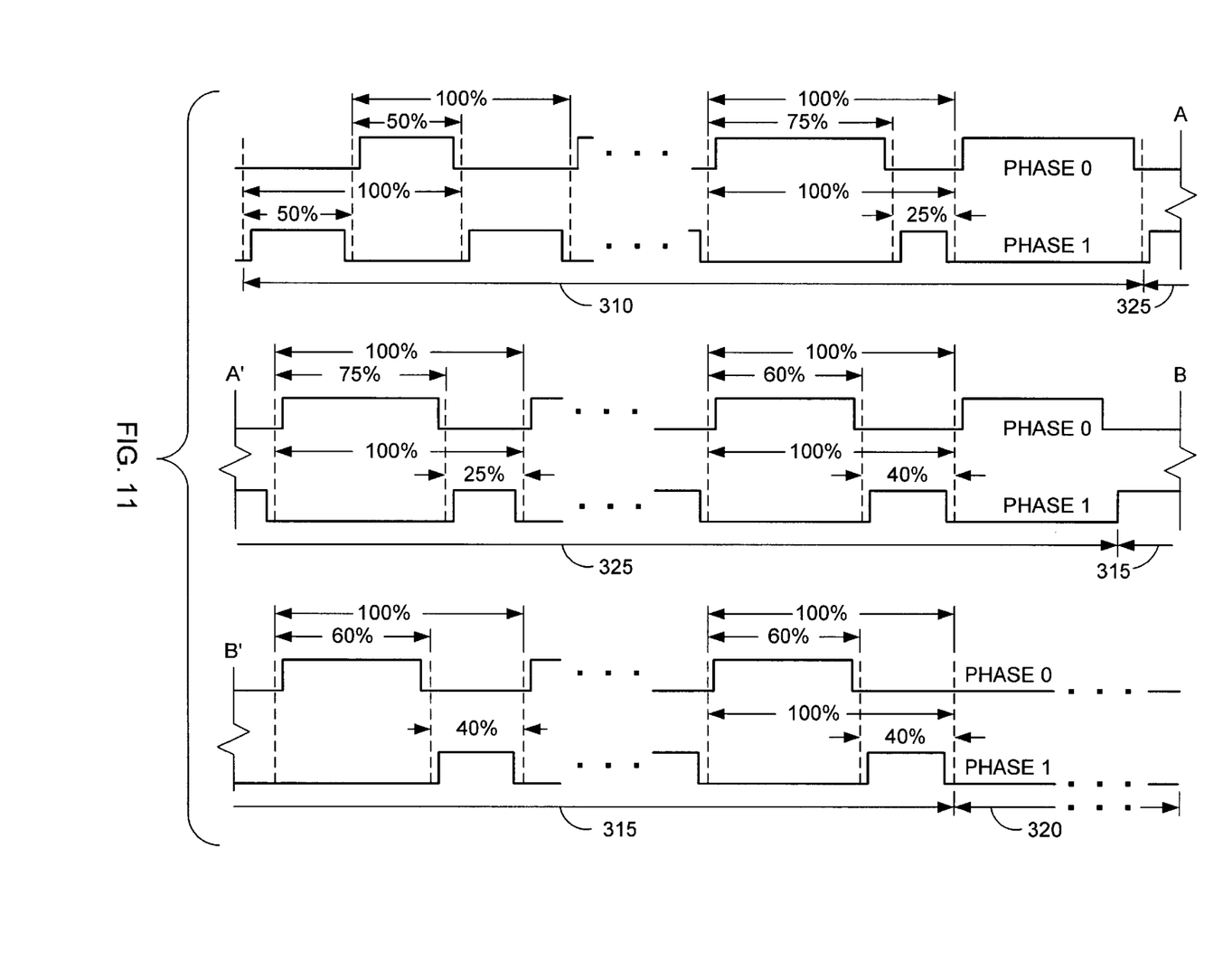
FIG. 11 is a timing diagram representing first and second control signals during a time period.

In addition to using frequency transitioning, it may be beneficial to use duty-cycle transitioning during one or more intervals of the time period 305. For some applications, more severe drive offset is required to prevent neon plasma bubbling when the signals phase0 and phase1 are very narrow pulses (e.g., during the first interval 310). For one embodiment and as schematically represented in FIG. 11, the first interval 310 is started with a balanced output drive to minimize the effective frequency of the narrowest individual pulses. Minimizing the effective frequency minimizes EMI noise. As shown in FIG. 11, the first interval is started with signal phase0 having a first frequency (e.g., one hundred kHz.) and a first duty cycle (e.g., fifty percent), and signal phase1 having the first frequency and a second duty cycle (e.g., fifty percent). To minimize the effective frequency and to minimize anti-bubbling characteristics, the duty cycles of the signals phase0 and phase1 are gradually transitioned from a balanced output drive at the highest frequency to a first unbalanced output at the end of the frequency-transitioning interval. As shown in FIG. 11, the signal phase0 is transitioned from the first frequency and the first duty cycle to a second frequency (e.g., the resonant frequency) and a second duty cycle (e.g., seventy-five percent duty cycle), and the signal phase1 is transitioned from the first frequency and the second duty cycle to the second frequency and a fourth duty cycle (e.g., twenty-five percent duty cycle).

While the remaining drive pulses in the given pulse group could then be driven at this unbalanced relationship (i.e., the software proceeds to the "ON" interval 315), for some applications, this may place too severe of a restriction on the maximum current that can be delivered to the tube load 110. That is, any deviation from balanced drive reduces the net energy transfer across the transformer T1. To overcome this, between the first and second intervals 310 and 315, a fourth interval 325 (also referred to herein as a "duty-cycle transitioning" interval) of the time period 305 is used to perform duty cycle transitioning. For duty cycle transitioning, the drive duty cycles are transitioned from the first unbalanced drive to a second unbalanced drive that is less severe than the first unbalanced drive. Specifically, as shown in FIG. 11, the signal phase0 is transitioned from the second frequency and third duty cycle to the second frequency and a fifth duty cycle (e.g., sixty percent duty cycle), and the signal phase1 is transitioned from the second frequency and the fourth duty cycle to the second frequency and a sixth duty cycle (e.g., forty percent duty cycle). Although the lengths of the first and fourth intervals may vary, in one embodiment, the first and fourth intervals are approximately five percent of the time period 305. This leaves the majority of the time period 305 for the second and third intervals (i.e., for brightness control).

While neon tubes require an offset to prevent neon bubbling, mercury/argon tubes can tolerate an offset for a short time only. Operation with an offset for too long causes the mercury ions to migrate toward one end of the tube 110, resulting in darkening at the other end of the tube 110. In order to prevent the migration of the mercury, the drive polarity is periodically reversed. The present invention accomplishes this by reversing the drive polarity every half cycle of the utility voltage. Thus, the offset drive required by neon loads is maintained, and the long-term non-offset required by mercury/argon loads is maintained.

As can be seen from the above, the invention provides a new and useful power supply for brightness control of a gas-discharge tube. Various features and advantages of the invention are set forth in the following claims.

What is claimed is:

1. A method of controlling the brightness of a gas-discharge tube, the method comprising:
   providing a power supply having a resonant circuit;
   establishing a time period;
   generating a varying signal having a varying frequency including,
      for a first time interval of the time period, transitioning the varying frequency from a first frequency to a second frequency, and
      for a second interval of the time period after the first interval, generating the varying signal at the second frequency;
   for a third interval of the time period, ceasing generation of the varying signal; and
   providing the varying signal to the resonant circuit.

2. A method as set forth in claim 1 wherein the first frequency is a high frequency, and wherein the second frequency is a resonant frequency.

3. A method as set forth in claim 1 wherein the first frequency is a low frequency, and wherein the second frequency is a resonant frequency.

4. A method as set forth in claim 1 wherein the providing step further includes providing a pair of switches interconnected to the resonant circuit and providing a driver interconnected to the first and second switches, and wherein the step of generating a varying signal having a varying frequency includes
   generating first and second drive signals at a drive frequency related to the varying frequency, and
   providing the first and second drive signals to the first and second switches, respectively, the providing of the first and second drive signals resulting in the varying signal.

5. A method as set forth in claim 4 wherein the generating of the first and second drive signals include, for the first interval,
   generating the first drive signal with a first duty cycle,
   generating the second drive signal with a second duty cycle,
   transitioning the first drive signal from the first duty cycle to a third duty cycle, the third duty cycle being greater than the first duty cycle, and
   transitioning the second drive signal from the second duty cycle to a fourth duty cycle, the fourth duty cycle being less than the second duty cycle.

6. A method as set forth in claim 5 wherein the transitioning of the first and second drive signals occurs concurrently.

7. A method as set forth in claim 5 wherein the first and third duty cycles are substantially the same, and wherein the second and fourth duty cycles are different.

8. A method as set forth in claim 5 wherein the first duty cycle is substantially fifty percent, the second duty cycle is substantially fifty percent, the third duty cycle is substantially seventy-five percent, and the fourth duty cycle is substantially twenty-five percent.

9. A method as set forth in claim 5 wherein the generating of the first and second drive signals further include, for the second interval,
   generating the first drive signal at the third duty cycle, and
   generating the second drive signal at the fourth duty cycle.

10. A method as set forth in claim 5 wherein the generating of the first and second drive signals further include, for a fourth interval between the first and second intervals,
    generating the first drive signal at the third duty cycle,
    generating the second drive signal at the fourth duty cycle,
    transitioning the first drive signal from the third duty cycle to a fifth duty cycle, and
    transitioning the second drive signal from the fourth duty cycle to a sixth duty cycle.

11. A method as set forth in claim 10 wherein the transitioning of the first and second drive signals occurs concurrently.

12. A method as set forth in claim 10 wherein the wherein the fifth duty cycle is less than the third duty cycle, and wherein the sixth duty cycle is greater than the fourth duty cycle.

13. A method as set forth in claim 12 wherein the first and second duty cycles are substantially the same, wherein the third and fourth duty cycles are different, and wherein the fifth and sixth duty cycles are different.

14. A method as set forth in claim 12 wherein the first duty cycle is substantially fifty percent, the second duty cycle is substantially fifty percent, the third duty cycle is substantially seventy-five percent, the fourth duty cycle is substantially twenty-five percent, the fifth duty cycle is substantially sixty percent, and the sixth duty cycle is substantially forty percent.

15. A method as set forth in claim 1 and further comprising determining tube brightness;
determining a length of the second interval; and
determining a length of the third interval.

16. A method as set forth in claim 1 wherein the first interval is approximately five percent of the time period.

17. A method as set forth in claim 10 wherein the first interval is approximately five percent of the time period, and the fourth interval is approximately five percent of the time period.

18. A method as set forth in claim 1 wherein the method further comprises providing a utility voltage to the power supply, and wherein the establishing of the time period includes synchronizing the time period to the utility voltage.

19. A method of controlling the brightness of a gas-discharge tube, the method comprising:
   providing a power supply including a resonant circuit, a pair of switches interconnected to the resonant circuit, and a driver interconnected to the first and second switches;
   establishing a time period;
   generating first and second drive signals including,
      for a frequency-transitioning interval of the time period, generating the first drive signal with a first frequency and a first duty cycle, generating the second drive signal with the first frequency and a second duty cycle, transitioning the first drive signal from the first frequency to a second frequency, transitioning the second drive signal from the first frequency to the second frequency, transitioning the first drive signal from a first duty cycle to a third duty cycle, the third duty cycle being greater than the first duty cycle, and transitioning the second drive signal from a second duty cycle to a fourth duty cycle, the fourth duty cycle being less than the second duty cycle,
      for a duty-cycle-transitioning interval of the time interval, generating the first drive signal at the second frequency and the third duty cycle, generating the second drive signal at the second frequency and the fourth duty cycle, transitioning the first drive signal from the third duty cycle to a fifth duty cycle, the fifth duty cycle being less than the third duty cycle, and transitioning the second drive signal from the fourth duty cycle to a sixth duty cycle, the sixth duty cycle being greater than the fourth duty cycle,
      for an ON interval of the time period, generating the first drive signal with the second frequency and the fifth duty cycle, generating the second drive signal with the second frequency and the sixth duty cycle; and
   providing the first and second drive signals to the first and second switches, respectively.

20. A method as set forth in claim 19 wherein, for the duty-cycle-transitioning interval, the transitioning steps occur concurrently.

21. A method as set forth in claim 19 and further comprising, for an OFF interval, ceasing generation of the first and second drive signals.

22. A method as set forth in claim 21 and further comprising
   determining tube brightness;
   determining a length of the ON interval; and
   determining a length of the OFF interval.

23. A method as set forth in claim 21 wherein the frequency-transitioning interval is approximately five percent of the time period, and the duty-cycle-transitioning interval is approximately five percent of the time period.

24. A method as set forth in claim 19 wherein the first drive frequency is a high frequency, and wherein the second drive frequency is a resonant frequency.

25. A method as set forth in claim 19 wherein the first drive frequency is a low frequency, and wherein the second drive frequency is a resonant frequency.

26. A method as set forth in claim 19 wherein the first and second duty cycles are substantially the same, wherein the third and fourth duty cycles are different, and wherein the fifth and sixth duty cycles are different.

27. A method as set forth in claim 26 wherein the first duty cycle is substantially fifty percent, the second duty cycle is substantially fifty percent, the third duty cycle is substantially seventy-five percent, the fourth duty cycle is substantially twenty-five percent, the fifth duty cycle is substantially sixty percent, and the sixth duty cycle is substantially forty percent.

28. A method as set forth in claim 19 wherein the method further comprises providing a utility voltage to the power supply, and wherein the establishing of the time period includes synchronizing the time period to the utility voltage.

29. A power supply connectable to a power source and to a gas-discharge tube for controlling a brightness of the tube, the power supply comprising:
   a transformer having a primary winding and a secondary winding, the tube being connectable across the secondary winding;
   first and second switches that receive first and second drive signals, respectively, and switch power to the primary winding;
   a resonant circuit having a resonant frequency and being interconnected to the first and second switches; and
   a controller interconnected to the first and second switches, the controller being operable to generate the first and second drive signals for a time period including,
      for a first time interval of the time period, generating the first and second drive signal with a first frequency and transitioning the first and second drive signals from the first frequency to a second frequency,
      for a second time interval of the time period, generating the first and second drive signals at the second frequency, and
      for a third interval of the time period, ceasing generation of the first and second drive signals.

30. A power supply as set forth in claim 29 wherein the resonant circuit includes an inductor/capacitor (LC) resonant circuit.

31. A power supply as set forth in claim 30 wherein the LC resonant circuit includes an inductor, and wherein the inductor includes the primary winding.

32. A power supply as set forth in claim 29 wherein the first frequency is a high frequency, and wherein the second frequency is a resonant frequency.

33. A power supply as set forth in claim 29 wherein the first frequency is a low frequency, and wherein the second frequency is a resonant frequency.

34. A power supply as set forth in claim 29 wherein the controller is further operable to generate the first and second drive signals for a time period including, for the first time interval,
   generating the first drive signal with a first duty cycle,
   generating the second drive signal with a second duty cycle,
   transitioning the first drive signal from the first duty cycle to a third duty cycle, transitioning the second drive signal from the second duty cycle to a fourth duty cycle.

35. A power supply as set forth in claim 34 wherein the first and second duty cycles are substantially the same, and wherein the third and fourth duty cycles are different.

36. A power supply as set forth in claim 34 wherein the first duty cycle is substantially fifty percent, the second duty cycle is substantially fifty percent, the third duty cycle is substantially seventy-five percent, and the fourth duty cycle is substantially twenty-five percent.

37. A power supply as set forth in claim 34 wherein the controller is further operable to generate the first and second drive signals for a time period including, for the second time interval, generating the first drive signal at the third duty cycle, and generating the second drive signal at the second duty cycle.

38. A power supply as set forth in claim 34 wherein the controller is further operable to generate the first and second drive signals for a time period including, for a fourth interval between the first and second intervals, generating the first drive signal at the third duty cycle, generating the second drive signal at the fourth duty cycle, transitioning the first drive signal from the third duty cycle to a fifth duty cycle, and transitioning the second drive signal from the fourth duty cycle to a sixth duty cycle.

39. A power supply as set forth in claim 38 wherein the wherein the fifth duty cycle is less than the third duty cycle, and wherein the sixth duty cycle is greater than the fourth duty cycle.

40. A power supply as set forth in claim 39 wherein the first and second duty cycles are substantially the same, wherein the third and fourth duty cycles are different, and wherein the fifth and sixth duty cycles are different.

41. A power supply as set forth in claim 39 wherein the first duty cycle is substantially fifty percent, the second duty cycle is substantially fifty percent, the third duty cycle is substantially seventy-five percent, the fourth duty cycle is substantially twenty-five percent, the fifth duty cycle is substantially sixty percent, and the sixth duty cycle is substantially forty percent.

42. A power supply as set forth in claim 29 and further comprising an input device operable to receive a desired tube brightness from an operator; and wherein the controller determines a length of the second and third intervals corresponding to the tube brightness.

43. A power supply as set forth in claim 29 wherein the first interval is approximately five percent of the time period.

44. A power supply as set forth in claim 38 wherein the first interval is approximately five percent of the time period, and the fourth interval is approximately five percent of the time period.

45. A power supply as set forth in claim 29 wherein the power source has a utility frequency, wherein the power supply further comprises a phase detector interconnected to the controller, wherein the phase detector provides a synchronizing signal, and wherein the controller synchronizes the time period to the controller.

* * * * *